United States Patent
Reigo et al.

(10) Patent No.: US 9,720,417 B2
(45) Date of Patent: Aug. 1, 2017

(54) NAVIGATION FOR A ROBOTIC WORKING TOOL

(71) Applicant: HUSQVARNA AB, Huskvarna (SE)

(72) Inventors: Peter Reigo, Djursholm (SE); Patrik Jägenstedt, Tenhult (SE); Magnus Öhrlund, Malmbäck (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/104,567

(22) PCT Filed: Dec. 19, 2013

(86) PCT No.: PCT/SE2013/051576
§ 371 (c)(1),
(2) Date: Jun. 15, 2016

(87) PCT Pub. No.: WO2015/094054
PCT Pub. Date: Jun. 25, 2015

(65) Prior Publication Data
US 2017/0031368 A1    Feb. 2, 2017

(51) Int. Cl.
*G05D 1/02* (2006.01)
*G01S 19/13* (2010.01)
(Continued)

(52) U.S. Cl.
CPC ......... *G05D 1/0274* (2013.01); *A01D 34/008* (2013.01); *B60L 1/003* (2013.01);
(Continued)

(58) Field of Classification Search
CPC .. G05D 1/0274; G05D 1/0278; G05D 1/0231; G05D 2201/0203;
(Continued)

(56) References Cited

U.S. PATENT DOCUMENTS 7,299,056 B2 * 11/2007 Anderson ............... G01S 19/49
455/456.1
9,068,839 B2 * 6/2015 Mattila .................. G01C 21/00
(Continued)

FOREIGN PATENT DOCUMENTS

WO    2008005661 A2    1/2008

OTHER PUBLICATIONS

International Search Report and Written Opinion for International Application No. PCT/SE2013/051576 mailed Sep. 17, 2014, all enclosed pages cited.
(Continued)

*Primary Examiner* — Michael J Zanelli
(74) *Attorney, Agent, or Firm* — McNair Law Firm, P.A.

(57) ABSTRACT

A robotic work tool system includes a charging station and a robotic work tool. The robotic work tool includes a position determining device for determining a current position. The robotic work tool may be configured to determine that reliable navigation through the position determining device is no longer possible, such as when satellite signal reception is not possible, at a time point and position and in response thereto generate an obstacle map which gives information on the position of at least one obstacle, determine when an area will be shadowed with regards to satellite reception based on the obstacle map, and schedule operation of the robotic work tool accordingly.

20 Claims, 2 Drawing Sheets

(51) Int. Cl.
*A01D 34/00* (2006.01)
*G01C 21/00* (2006.01)
*G01C 21/16* (2006.01)
*B60L 1/00* (2006.01)
*B60L 8/00* (2006.01)
*B60L 11/14* (2006.01)
*B60L 11/18* (2006.01)
*B60L 15/20* (2006.01)

(52) U.S. Cl.
CPC ............... *B60L 8/003* (2013.01); *B60L 11/14* (2013.01); *B60L 11/1805* (2013.01); *B60L 11/1816* (2013.01); *B60L 11/1824* (2013.01); *B60L 15/2036* (2013.01); *G01C 21/165* (2013.01); *G01S 19/13* (2013.01); *G05D 1/0231* (2013.01); *G05D 1/0278* (2013.01); *B60L 2200/40* (2013.01); *B60L 2220/46* (2013.01); *B60L 2240/12* (2013.01); *B60L 2240/62* (2013.01); *B60L 2260/32* (2013.01); *G05D 2201/0203* (2013.01); *G05D 2201/0208* (2013.01); *G05D 2201/0209* (2013.01); *G05D 2201/0215* (2013.01); *Y02T 10/645* (2013.01); *Y02T 10/70* (2013.01); *Y02T 10/7005* (2013.01); *Y02T 10/7072* (2013.01); *Y02T 10/7077* (2013.01); *Y02T 10/7083* (2013.01); *Y02T 10/72* (2013.01); *Y02T 10/7275* (2013.01); *Y02T 10/7291* (2013.01); *Y02T 90/121* (2013.01); *Y02T 90/14* (2013.01); *Y02T 90/16* (2013.01); *Y02T 90/162* (2013.01)

(58) Field of Classification Search
CPC ... G05D 2201/0215; G05D 2201/0209; G05D 2201/0208; G01S 19/13; A01D 34/008
See application file for complete search history.

(56) References Cited

U.S. PATENT DOCUMENTS

| | | | |
|---|---|---|---|
| 2007/0005243 A1* | 1/2007 | Horvitz | G01S 19/14 701/484 |
| 2012/0095651 A1 | 4/2012 | Anderson | |
| 2012/0296566 A1 | 11/2012 | Ban et al. | |
| 2014/0266873 A1* | 9/2014 | Pighin | G01S 19/40 342/357.23 |

OTHER PUBLICATIONS

Chapter I International Preliminary Report On Patentability for International Application No. PCT/SE2013/051576 issued on Jun. 21, 2016, all enclosed pages cited.

Maier, D. et al., "Improved GPS Sensor Model for Mobile Robots in Urban Terrain", IEEE International Conference on Robotics and Automation, pp. 4385-4390 (May 3-7, 2010), all enclosed pages cited.

* cited by examiner

NAVIGATION FOR A ROBOTIC WORKING TOOL

TECHNICAL FIELD

This application relates to a method and a robotic work tool system for an improved navigation for a robotic work tool. And in particular to a robotic work tool configured for satellite assisted navigation

BACKGROUND

Contemporary robotic work tools are becoming more and more advanced and are able to perform more and more advanced tasks such as executing advanced operation patterns. In the example of lawnmower robots the advanced working pattern may be a complicated mowing pattern based on the layout of a garden including bushes, garden islands and other structures. To successfully navigate such complicated areas some contemporary robotic work tools employ satellite navigation.

A satellite navigation or sat nav system is a system of satellites that provide autonomous geo-spatial positioning with global coverage. It allows small electronic receivers to determine their location (longitude, latitude, and altitude) to within a few meters, or even centimeters, using signals transmitted along a line-of-sight by radio from satellites. Receivers calculate the precise time as well as position and carrier phase, which can be used as a reference for scientific experiments. A satellite navigation system with global coverage may be termed a global navigation satellite system or GNSS (Global Navigation Satellite System).

The use of GNSS systems requires good reception of satellite signals to work reliably. The satellite signals may sometimes be blocked by buildings, roofs, awnings, foliage or trees. To improve the accuracy of GNSS systems a reference receiver, or beacon, within a short distance from the target receiver can be used. This is called differential GNSS. There are several DGNSS techniques, such as the classical DGNSS (or DGPS), the Real Time Kinematics (RTK) and the Wide Area RTK (WARTK).

However, the signal from a beacon may also be blocked by for example a house if the garden or other work area extends around the building.

It should be noted that similar problems exist also for other position determining devices, such as using optical beacons where the line of sight may be blocked in certain areas.

If the robotic work tool is unable to correctly receive the signals from the position determining system, the robotic work tool will be challenged to correctly navigate the work area and a satisfactory coverage of the work area may not be achieved by the robotic work tool.

Even though the problems above have been discussed for lawnmower robotic work tools, the same or similar problems exist also for other robotic work tools.

There is thus a need for a manner of enabling reliable operation of a robotic work tool even in situations where the robotic work tool may not be able to always receive reliable and accurate signals in all areas of a work area.

SUMMARY

It is an object of the teachings of this application to overcome the problems listed above by providing a robotic work tool system, comprising a robotic work tool, said robotic work tool comprising a position determining device for determining a current position, the robotic work tool being configured to determine that reliable navigation through said position determining device (190) is no longer possible, such as when satellite signal reception is not possible, at a time point and position and in response thereto generate an obstacle map which gives information on the position of at least one obstacle, determine when an area will be shadowed with regards to satellite reception based on said obstacle map, and to schedule operation of the robotic work tool accordingly.

It should be noted that the shadow map may also include information on the number of satellites that are visible to the robotic work tool at a position at a time. The number of satellites being visible increases the accuracy of the position determined.

In one embodiment the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a method for use in a robotic work tool system comprising a robotic work tool, said robotic work tool comprising a position determining device for determining a current position the method comprising determining that reliable navigation through said position determining device (190) is no longer possible, such as when satellite signal reception is not possible, at a time point and position and in response thereto generating an obstacle map which gives information on the position of at least one obstacle, determining when an area will be shadowed with regards to satellite reception based on said obstacle map, and to scheduling operation of the robotic work tool accordingly.

The inventors of the present invention have realized, after inventive and insightful reasoning that by comparing positions at which a signal to a satellite is lost it is possible to obtain information on obstacles blocking such signals and thereby determine when an area may be shadowed with regards to reliable satellite reception and when the area may be clear for reliable satellite signal reception. The robotic work tool may therefore be able to schedule its operation so that the areas that are shadowed are as small as possible or alternatively schedule its operation so that areas are covered when they are clear for satellite reception. As the satellites' movements are known it is possible to determine a satellite's position at all times and therefore possible to determine when an area will be shadowed again reliable satellite reception.

In one embodiment the robotic work tool is configured to determine if an obstacle is a (semi-) permanent obstacle or a temporary obstacle. A temporary obstacle may be a truck or an awning for example. The robotic work tool may be configured to indicate such temporary obstacle in the obstacle map as well, indicating at what times the temporary obstacle is present.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
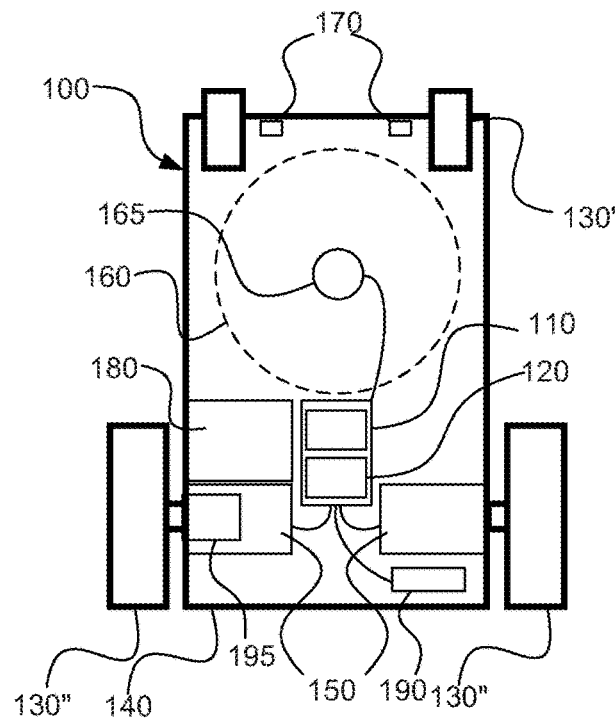
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively or additionally be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

Alternatively, the robotic work tool 100 may be arranged to operate within the work area solely or mainly based on the position determining device 190. A user may then establish a work area through coordinates and the robotic work tool will ensure that it stays within those coordinates based on the signals received by the position determining device 190.

Other examples of position determining devices 190 include optical (such as laser) position determining devices, other radio frequency position determining systems, and ultrawideband (UWB) beacons and receivers. The robotic work tool 100 is further arranged with at least one sensor 195 for providing signals for deduced reckoning navigation. Examples of such deduced reckoning navigation sensors 195 are odometers, accelerometers, gyroscopes and compasses. In one embodiment the robotic work tool is arranged to navigate using no sensors, thereby operating based on collision or boundary detection such navigation is well-known in the art and will not be described in further detail.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150. In one embodiment the robotic work tool is arranged with solar panels for supplying power to the battery 180.

Figure 2:
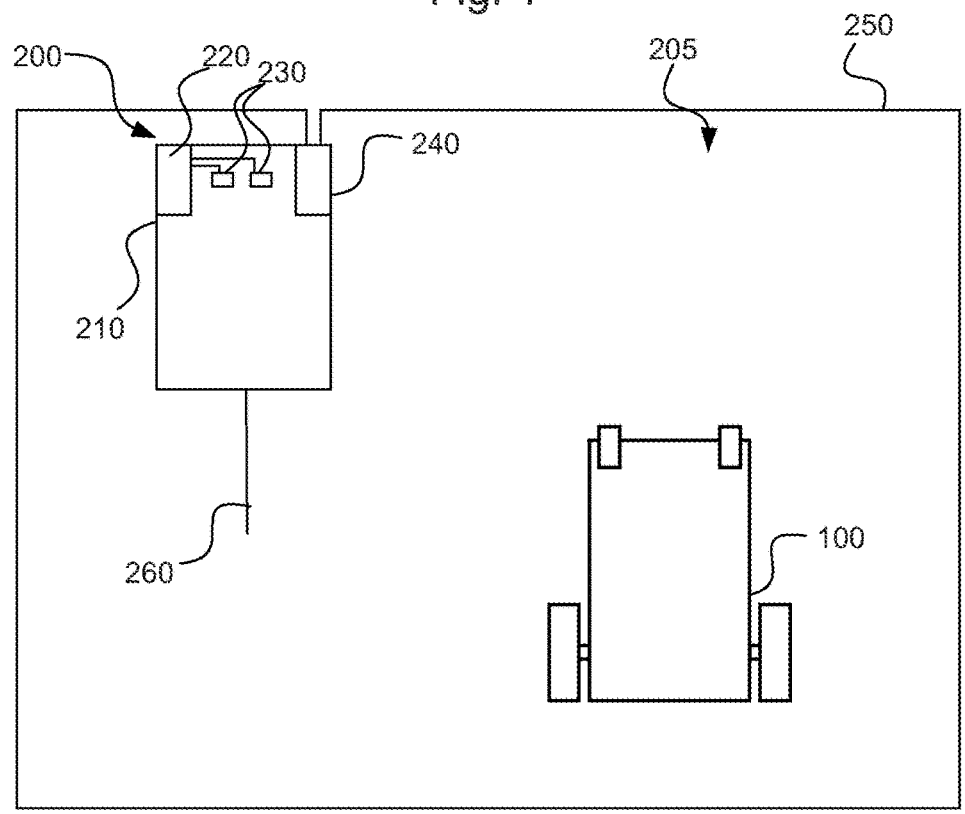
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. As stated above, the robotic work tool 100 may be arranged to operate solely using the position determining device in which case no boundary wire 250 nor signal generator (to be disclosed) is part of the system 200. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. As is known in the art, the control signal will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3:
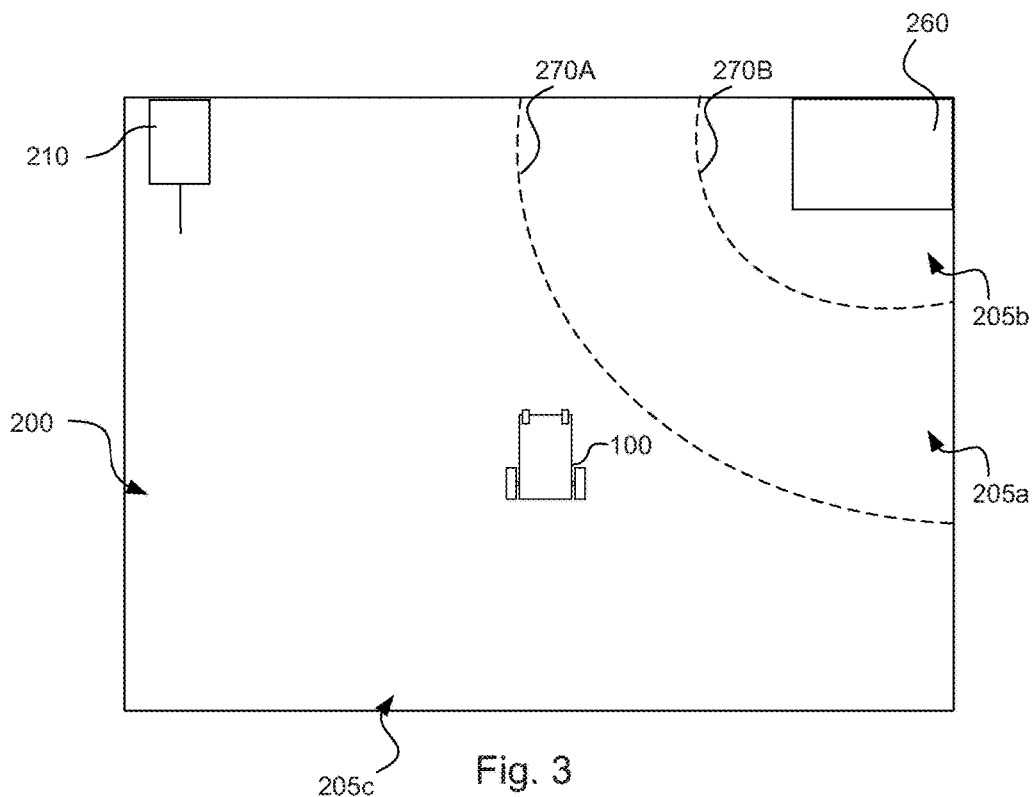
FIG. 3 shows a schematic view of a robotic working tool system in operation according to one embodiment of the teachings of this application.

FIG. 3 shows another schematic view of a robotic work tool system 200 according to the teachings herein, such as the robotic work tool system 200 of FIG. 2, being depicted here at a larger scale.

The work area 205 is shown here to include one obstacle 260. It should be noted that there may be more than one obstacle 260 and that the obstacles(s) 260 may also be located outside the work area 205.

The obstacle will at times block satellite signals that are to be received satellites (not shown in FIG. 3, but referenced 280 in FIG. 4) which causes shadowed areas 205*a* and 205*a* to occur in the work area. The shadowed areas 205*a*, 205*a* are shadowed in that they are areas where reliable signal reception from a satellite is not possible as the robotic work tool is within a satellite signal shadow of an obstacle.

As GNSS satellites are not stationary these shadowed areas 205*a*, 205*b* may vary in size and place position. In FIG. 3 the shadowed areas 205*a* and 205*b* are indicated by their borders, hereafter referred to as shadow borders 270A and 270B respectively. The shadow border is thus a position at which a signal may not be received correctly from a satellite any longer (at a given time).

The robotic work tool is configured to determine that it can no longer receive a signal correctly at a time point and in response thereto generate or add to an obstacle map which gives information on the position and timestamp of obstacles 260. The robotic work tool 100 may then later determine whether an area will be shadowed or not and schedule its operation accordingly to minimize the areas in which dead reckoning or other navigation method is to be used or to schedule operation for different areas at different times ensuring that an area is covered when it is not shadowed with regards to satellite reception.

In one embodiment the obstacle map is a shadow area map giving information on areas that are shadowed at specific times. As the movement of the GNSS satellites 280 are periodic it is possible to determine future locations of the satellite(s).

The robotic work tool 100 is, in such an embodiment, configured to generate or update the shadow map by determining that a signal may no longer be correctly received at a point and store that point and a corresponding time point in the shadow map. This will provide a map over how the shadows change according to time, at least if the map is generated over a time period.

As has been indicated above, the shadow map may also include areas where the number of visible satellites at a specific time point is registered. The controller may thus be configured to determine the number of satellites that are visible at a time point and a position and store that number of satellites in the obstacle map, or the shadow map. As is known, the number of satellites being visible indicates the accuracy of the position determined.

In one embodiment, as will be discussed with reference to FIG. 4, the obstacle map is a topological map and the robotic work tool 100 is configured to determine the position and shape (such as height) of obstacles 260 in and around the work area. As the movement of the GNSS satellites are known it can be determined based on the topological data when an area will be shadowed or clear (with regards to satellite reception).

Figure 4:
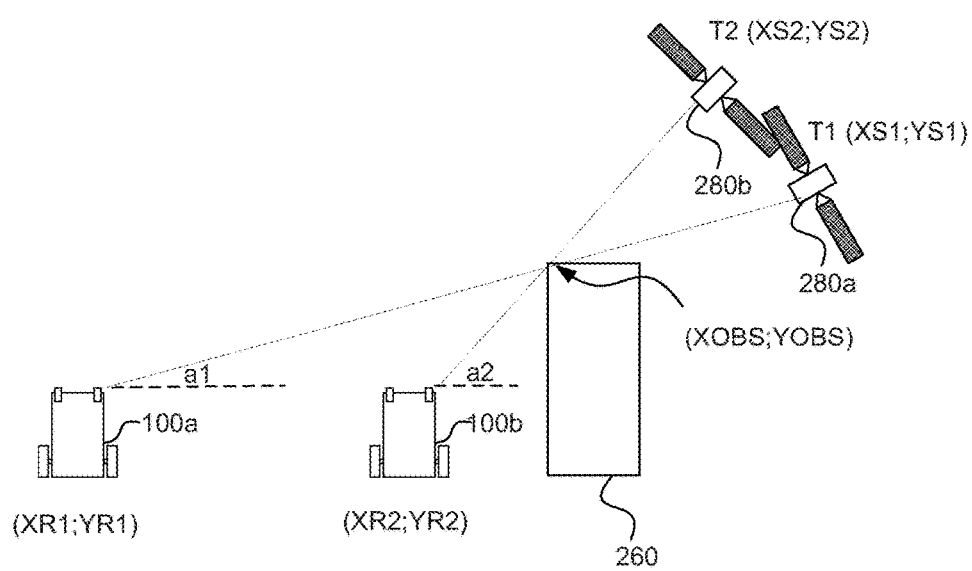
FIG. 4 shows a schematic illustration of the position and angular relationship in two dimensions between a robotic work tool, a satellite and an obstacle at different time points.

FIG. 4 shows a schematic illustration of the position and angular relationship in two dimensions between a robotic work tool, a satellite and an obstacle at different time points.

The robotic work tool 100 is configured to determine a first robot position (XR1;YR1) at which reception of a satellite signal is lost from a first satellite at a first time point T1. The robotic work tool 100 may further be configured to determine a first satellite position (XS1; YS1) of the satellite 280 at the first time point T1. The robotic work tool 100 is also configured to determine a second robot position (XR2; YR2) at which reception of a satellite signal is lost from a first satellite at a second time point T2. The robotic work tool 100 may further be configured to determine a second satellite position (XS2; YS2) of the satellite 280 at the second time point T2.

Alternatively, the robotic work tool 100 may be configured to determine a first angle a1 to the satellite when the signal is lost at the first time point T1 and a second angle to the satellite a2 when the signal is lost at the second time point T2.

As can be seen, the position (XOBS;YOBS) of an obstacle 260 may be determined by the robotic work tool 100 by comparing the angles a1 and a2 or by comparing the arcus tangens of the angles a1, a2 which are given by the coordinates of the robotic work tool 100 and the satellite 280 at the time points when the signal is lost. The arcus tangens of the angles may easily be derived from the robot positions and the satellite positions.

As is understood by a skilled person the same calculations may be performed for three dimensions as well.

It is thus possible to, over time, generate topological data for a work area and in particular of the obstacles in and around the work area that may influence satellite reception.

The robotic work tool 100 is configured to, based on the obstacle map, schedule its operation so that it operates in areas at times when the area is not shadowed with regards to satellite reception, or so that the areas that are shadowed with regards to satellite reception are reduced so that navigation using dead reckoning are limited.

In one embodiment the robotic work tool is configured to determine if an obstacle is a (semi-) permanent obstacle or a temporary obstacle. A temporary obstacle may be a truck or an awning for example. The robotic work tool will be able to detect such reoccurring temporary obstacle over time, by noting that the obstacle's presence is not dependent or synchronous with any of the detected satellites. The robotic work tool may be configured to indicate such temporary obstacle in the obstacle map as well, indicating at what times the temporary obstacle is present.

In one embodiment, the robotic work tool 100 is further configured to predict a risk of collision based on the obstacle map by comparing a current position to a position of an object indicated by the obstacle map. Possibly, the direction of the robotic work tool 100 is also taken into consideration to determine if there is an obstacle in the path of the robotic work tool 100. If there is an object 260 close to or on the path of the robotic work tool 100, the robotic work tool may take measurements to avoid, or at least mitigate the consequences of, a collision. Such measurements include, but are not limited to, reducing the robotic work tool's 100 speed, changing direction, stopping to name a few.

This allows for a reduced wear and tear of the robotic work tool 100 which increases the lifetime of the robotic work tool 100, alternatively it increases the intervals between maintenances.

In one embodiment, where the robotic work tool 100 is solar driven or solar charged, the robotic work tool 100 may be arranged to determine that an area is shadowed with regards to the sun. The sun's position and movement is, as for the satellites 280, known and can be determined for future operations. A shadowed area is detected by a (sudden) drop in voltage over a solar panel which indicates that the robotic work tool 100 has entered a shadowed area.

The robotic work tool 100 of such an embodiment may thus generate an obstacle map indicating when certain areas will be shadowed with regards to the sun, and schedule its operation accordingly so that the robotic work tool 100 is exposed to as much sunlight as possible during an operation.

One benefit of the teachings herein is that a robotic work tool is enabled to provide a satisfactory mowing pattern even if the robotic work tool 100 is not able to receive a reliable signal from a satellite all the time and/or in all areas.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool, said robotic work tool comprising a position determining device, including a satellite signal receiver, for determining a current position, the robotic work tool being configured to:

determine that reliable navigation through said position determining device is no longer possible, at a time point and position and in response thereto generate an obstacle map;

determine when an area will be shadowed with regards to satellite reception based on said obstacle map; and schedule operation of the robotic work tool based on the obstacle map.

2. The robotic work tool system according to claim 1, wherein the robotic work tool is further configured to determine a first robot position at which reception of a satellite signal is lost from a first satellite at a first time point;

determine a second robot position at which reception of a satellite signal is lost from the first satellite at a second time point; and generate said obstacle map based on said first and second robot position and said first and second time point.

3. The robotic work tool system according to claim 2, wherein the obstacle map is a shadow map giving information on areas that are at least partially shadowed, by an obstacle, at specific times.

4. The robotic work tool system according to claim 2, wherein the robotic work tool is further configured to determine a first satellite position of the first satellite at the first time point;

determine a second satellite position of the first satellite at the second time point;

determine a position of an obstacle based on the first and second satellite position and first and second robot position; and generate said obstacle map based on the obstacle position.

5. The robotic work tool system according to claim 4, wherein the obstacle map is a topological map.

6. The robotic work tool system according to claim 2, wherein the robotic work tool is further configured to determine a first angle to the first satellite at the first time point;

determine a second angle to the first satellite at the second time point;

determine a position for an obstacle based on said angles; and generate said obstacle map based on the position of the obstacle.

7. The robotic work tool system according to claim 1, wherein the robotic work tool is solar charged and wherein the robotic work tool is further configured to:

determine that the robotic work tool has entered an area that is shadowed from the sun at a particular time point and, based on determining that the robotic work tool has entered the area that is shadowed from the sun at the particular time point, generate a shadow map and schedule operation of the robotic work tool further based on said shadow map.

8. The robotic work tool system according to claim 1, wherein the robotic work tool is further configured to compare a current position to a position of an object-indicated by the obstacle map; and determine if there is an object close to or on the path of the robotic work tool, and in response thereto take one or more actions to avoid or at least mitigate consequences of a collision.

9. The robotic work tool system according to claim 1, wherein the position determining device is a Global Navigation Satellite System device.

10. The robotic work tool system according to claim 1, wherein the robotic work tool is a robotic lawnmower.

11. The robotic work tool system according to claim 1, wherein the robotic work tool is one of a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

12. The robotic work tool system according to claim 1, wherein the position determining device further comprises a laser positioning device.

13. The robotic work tool system according to claim 1, wherein the position determining device further comprises a radio frequency positioning device.

14. A method for use in a robotic work tool system, comprising a robotic work tool, said robotic work tool comprising a position determining device, including a satellite signal receiver, for determining a current position, the method comprising:
 determining that reliable navigation through said position determining device is no longer possible, at a time point and position and in response thereto generating an obstacle map which gives information on the position of at least one obstacle;
 determining when an area will be shadowed with regards to satellite reception based on said obstacle map; and
 scheduling operation of the robotic work tool accordingly based on the obstacle map.

15. The method for use in robotic work tool system according to claim 14 further comprising:
 determining a first robot position at which reception of a satellite signal is lost from a first satellite at a first time point;
 determining a second robot position at which reception of a satellite signal is lost from the first satellite at a second time point; and
 generating said obstacle map based on said first and second robot position and said first and second time point.

16. The method for use in robotic work tool system according to claim 15, wherein the obstacle map is a shadow map giving information on areas that are at least partially shadowed, by an obstacle, at specific times.

17. The method for use in robotic work tool system according to claim 15 further comprising:
 determining a first satellite position of the first satellite at the first time point;
 determining a second satellite position of the first satellite at the second time point;
 determining a position for an obstacle based on the first and second satellite position and first and second robot position; and
 generating said obstacle map based on the obstacle position.

18. The method for use in robotic work tool system according to claim 17, wherein the obstacle map is a topological map.

19. The method for use in robotic work tool system according to claim 15 further comprising:
 determining a first angle to the first satellite at the first time point;
 determining a second angle to the first satellite at the second time point;
 determining a position for an obstacle based on said angles; and
 generating said obstacle map based on the obstacle position.

20. The method for use in robotic work tool system according to claim 1, wherein the robotic work tool is solar charged and wherein the method further comprises:
 determining that the robotic work tool has entered an area that is shadowed from the sun at a particular time point and,
 generating a shadow map and scheduling operation of the robotic work tool further based on said shadow map, in response to determining that the robotic work tool has entered the area that is shadowed from the sun at the particular time point.

* * * * *